United States Patent Office 3,748,229
Patented July 24, 1973

3,748,229
CIRCULATING SYSTEM FOR A NUCLEAR PRESSURE VESSEL
Jurgen Heinrich Schill, Winterthur, Switzerland, assignor to Sulzer Brothers Ltd., Winterthur, Switzerland
Filed June 2, 1971, Ser. No. 149,229
Int. Cl. G21c 15/24, 19/28
U.S. Cl. 176—65                                 6 Claims

ABSTRACT OF THE DISCLOSURE

The turbines for driving the circulating pumps are connected in series in the flow of the working medium. The turbines can be arranged in a closed ring along with a pump and can be provided with by-pass lines should it be necessary to shut down one or more turbines. Also, sets of serially connected turbines can be connected in parallel.

---

Figure 1:
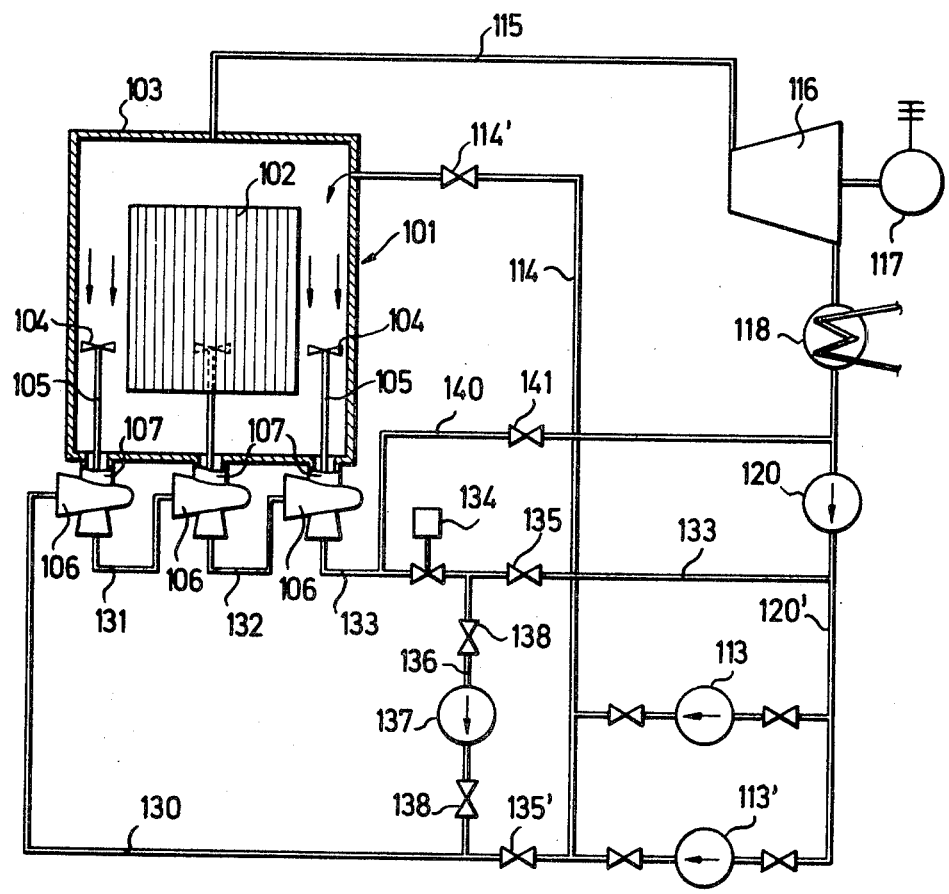

This invention relates to a circulating system for a nuclear pressure vessel.

Nuclear reactor installations of the boiling water type have been known in which circulating pumps have been used for circulating water in the reactor core. These pumps have generally been arranged with vanes inside the pressure vessel of the reactor so as to provide a simpler construction than external circulating systems previously used. However, since the drive for the pump has been by means of electric motors situated outside the pressure vessel, the shafts leading from the motors to the pump impellers must pass through seals, which, due to the risk of radioactive contamination, must be completely sealed off from the exterior and therefore are complicated and expensive. Also, the axial thrust from the circulating pumps, which is caused by the internal pressure in the vessel and by the hydraulics, must be absorbed, which makes the sealing problem even greater.

Other nuclear reactor installations of this type have also become known, such as those described in U.S. patent application Ser. No. 28,573, filed Apr. 15, 1970. In these installations, pumps have been positioned inside the pressure vessel for circulating a liquid working medium and have been driven by one or more turbines outside the pressure vessel. The turbines have been connected in parallel and have been driven by directing separate flows of the working medium through the turbines.

However, it has been found, for various reasons, that individual turbines, e.g. a Francis turbine, cannot work with good efficiency at the heads usually available for driving the turbines, namely heads in the range of from 10 to 80 atmospheres, and more.

Accordingly, it is an object of the invention to obtain a more efficient use of the turbines used to drive the circulating pumps within a pressure vessel of a nuclear reactor.

It is another object of the invention to construct a turbine for a circulating system of a nuclear reactor in an economical manner.

Briefly, the invention provides a circulating system for circulating the working medium in a pressure vessel of a nuclear reactor in which a plurality of turbines, each of which drives a circulating pump in the pressure vessel are set in series in the flow of the working medium. By means of the invention, it is possible to distribute the head available for driving the turbines among a number of individual turbines so that the turbines are able to operate in a region of specific rotary speeds best suited for their type. The circulating system also incorporates an adjusting means, such as a regulatory valve, set in series with the turbines through which the output of the turbines is adjustable. By means of this arrangement, it is possible to control with a single regulatory valve the operation of an entire series of turbines.

In one embodiment, a number of sets of series-connected turbines are arranged in parallel. This arrangement is particularly suitable for cases where use is made of a great number of turbines which, if all were connected in series, would result in a smaller head per turbine.

In another embodiment, the series circuitry of the turbines is arranged in the form of a closed ring and is provided with a special drive pump set in series with the turbines in the ring. In this way, the drive pump can be designed and constructed independently of the feed pumps for the nuclear reactor plant. Also, the circulating pumps driven by the turbines can be operated completely independently of the feed.

The series-connection of the turbines can be connected to a supply line for the nuclear reactor plant downstream of the feed pump for the pressure vessel to return the working medium emerging from the turbines into the working medium line upstream of the feed pump. In this way, it is possible to maintain a drive of the turbines through the feed pump. If a series connection with a single pump for the drive of the turbines is provided, then, a supply of fluid working medium from the feed line into the closed ring is possible through a connection downstream of the feed pump. In each case, a corresponding quantity of the fluid working medium is separated out of the ring and into the feed line upstream of the feed pump. In this way, it is possible to prevent excessive heating of the working medium circulating in the ring circuit.

Alternatively, it is also possible to connect a circuit including the series-connected turbines and a pump to the feed line of working medium both upstream and downstream of a condensate pump. This arrangement has the special advantage that because of the preheater normally installed between the condensate pump and the feed pump, the working medium coming out of the condensate pump is considerably cooler, and is therefore better suited for cooling the working medium circulating in the circular hook-up than is the working medium passing out of the feed pump.

Figure 2:
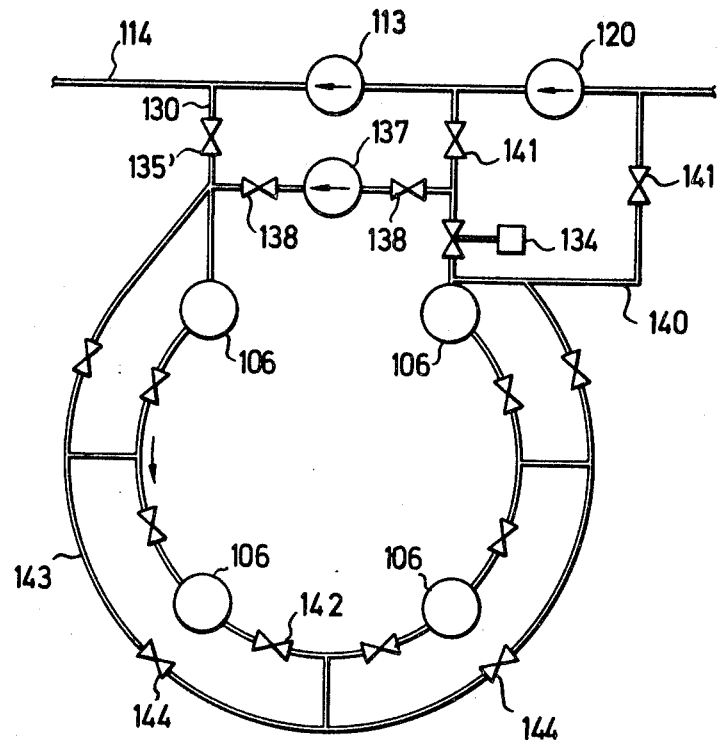
Figure 3:
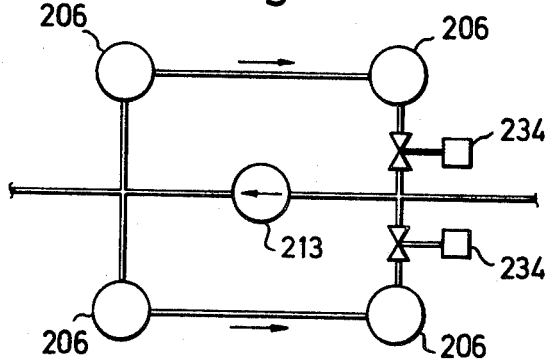

These and other objects and advantages of the invention will become more apparent from the following detailed description taken in conjunction with the accompanying drawings in which:

FIG. 1 schematically illustrates a circulating system according to the invention connected to a pressure vessel of a nucler reactor;

FIG. 2 schematically illustrates a closed ring embodiment of the circulating system of the invention; and FIG. 3 partially illustrates a parallel connection of two sets of serially-connected turbines according to the invention.

Referring to FIG. 1, a nuclear reactor 101, e.g. of the boiling water type is provided with a reactor core 102 and a pressure vessel 103 in which the reactor core 102 is immersed in light water. During operation, the water evaporates due to the heat evolved in the reactor core 102 and is used to do work. In order to improve the heat transfer between the water and the fuel elements inside the reactor core 102, the water in the pressure vessel 103 is circulated by means of axial-type circulating pumps 104. Alternatively, pumps of the semi-axial type or pumps with vaned rotors could, of course, be used. The circulating pumps 104 are connected by shafts 105 to the rotors of turbines 106 located outside of and below the pressure vessel 103. The casings of these turbines 106 are connected to the pressure vessel 103 by fixed tubular elements 107 which are sealed off from the exterior and may be integral with the turbine casings. Alternatively, the elements 107 may be pipe connections which belong to the pressure vessel, and through which the shafts 105 pass.

The nuclear reactor is provided with feed pumps 113 and 113', which serve to pump feed water for the reactor 101 through a pipe 114, in which there may be provided a regulatory valve 114'. The steam generated in the reactor 101 is conducted through a pipe 115 to a steam-turbine 116, which drives an electric generator 117. From the turbine 116, the expanded steam arrives in a condenser 118. The water formed in the condenser 118 is fed by means of a condensate pump 120 to the feed pumps 113, 113' so as to close the circuit of the working medium through the nuclear reactor 101. A line 130 branches from the feed line 114 and connects to the first turbine 106 so as to supply working medium to the turbine 106. In addition, a connection line 131 is connected between the output of the first turbine 106 and the input of the next turbine 106, whose output is connected by a line 132 to the last of the illustrated turbines. These lines 131, 132 serve to connect the turbines 106 in series with respect to the working medium flow. A line 133 also connects the output from the last turbine 106 into a supply line 120' that connects the condensate pump 120 with the feed pumps 113 and 113'. An adjusting means 134, e.g. a regulatory valve, together with a valve 135 are installed in the line 133 while a connecting line 136 branches off from the line 133 between the valves 134, 135 to connect to the line 130. A pump 137 is positioned in the line 136 along with a pair of shut-off valves 138 upstream and downstream of the pump 137. A line 140 branches off from the line 133 upstream of the regulatory valve 134 and has a valve 141 disposed therein. Also, a valve 135 is installed in the line 130 between the pumps 113, 113' and the line 136 while other valves 145 are installed upstream and downstream of the pumps 113, 113' as shown.

Referring to FIG. 2, wherein like reference characters indicate like parts as above, and wherein the feed pump 113' has been omitted for clarity, the turbines 106 can be arranged in a closed ring. To this end, a shut-off valve 142, e.g. a slide, is disposed in the connecting lines upstream and downstream of each of the turbines. Furthermore, each turbine 106 is provided with a bypass line 143 in which a throttling or shut-off valve 144 is installed. The shut-off valves 142 permit the switching out of any desired turbine 106 in the event of a defect or under certain operating conditions. The working medium which would otherwise flow through the turbine concerned is, in such a case, bypassed through the appropriate bypass line 143.

The circuitry shown in FIGS. 1 and 2 can operate in various ways. If the shut-off valves 138 in the connecting line 136 are closed, then the turbines 106 are driven through one of the feed pumps 113, 113', or through both together. The working medium forwarded by the feed pumps 113 and 113' then flows in a gradient through the line 130, the turbines 106 and the lines 131, 132 and 133, via the adjusting means 134 into the line 120'. The adjusting means 134 serves to regulate the flow of the working medium through the turbines 106 so that the output performance of the turbine is regulated.

When, on the other hand, the valves 138 are open and the pump 137 is put into operation, the turbines 106 are driven by the drive pump 137. In such a case, the working medium flows out of the pump 137 through the lines 130, 131, 132 and 133, through the turbines 106 and the regulatory valve 134, and back to the suction side of the pump 137. The valve 141 is hereby closed. In principle, it would also be possible for the valves 135 and 135' to be closed, so that the operative circuit of the turbines would be operatively separated from the circuit of the feed water. In this latter case, there would be the advantage that the same working medium would be in the turbines and in the reactor vessel 103, although under certain circumstances at different pressures. Thus, special seals might be omitted. The separation of the turbines 106 from the inner space of the reactor vessel 103 might, for example, be carried out in a simple way by plain bearings, without special seals, whereby a certain flow of the working medium through the bearing might be allowable.

Preferably, however, the valves 135, 135' allow a slight flow of working medium in order to produce a connection between the two circuits of the feed pumps 113, 113', and of the drive pump 137. This allows a cooling of the working medium flowing through the pipes 130, 131, 132, 133 and 136, as well as through the pump 137 and the turbines 106, with overheating of the medium being avoided. In order to regulate the performance of the turbines 106, the adjusting means 134 may also be made use of in this case.

Finally, it is possible during operation of the pump 137 to close the valve 135' and to open slightly the valves 135 and 141. This allows a mixing in of feed water which emerges from the condensate pump 120 and is situated in the line 120' into the turbine circuit during the driving of the turbines 106 by the pump 137. As a rule, this feed water is cooler than that coming out of the feed pumps 113, 113' or the working medium, because preheaters (not shown) are normally installed ahead of the feed pumps. With such a method of operation, better cooling of the working medium flowing through the pump 137 and the turbines 106 is obtained. Thus, the temperature of the medium can be lower, and the pumps and turbines can operate with better efficiency. In this case, it is also possible to influence the turbines through the adjusting means 134 as above.

Finally, referring to FIG. 3, the turbines can alternatively be arranged in at least two sets of serially arranged turbines 206 with the sets disposed in parallel with one another with the flow through each of the sets in each case being influenced by an adjusting means 234, a above. The drive of the turbines 206 is effected by a feed pump 213. This illustration is intended merely to show the possibility of forming parallel hook-ups of a number of series-connected turbines, whereby all the combinations shown in FIGS. 1 and 2 are possible.

What is claimed is:

1. In combination with a nuclear reactor having a reactor core and a pressure vessel for containing the core and a liquid working medium therein;
a circulating system for circulating the working medium in said pressure vessel comprising at least two circulating pumps inside said pressure vessel, at least two turbines connected in series with each other, each turbine being positioned adjacent said pressure vessel and mechanically connected by shaft means to a respective one of said pumps for driving said pumps, and means for directing a flow of the liquid working medium serially through said turbines to drive said turbines.

2. The combination as set forth in claim 1 wherein said means includes an adjusting means for regulating the flow of the liquid working medium through said turbines to adjust the output performance of said turbines.

3. The combination as set forth in claim 1 which includes at least two sets of two serially connected turbines connected in parallel with respect to the flow of working medium.

4. The combination as set forth in claim 1 which further comprises a pump connected in series with said turbines, said pump and said turbines forming a closed ring and being selectively connected to said means for a selective flow of the working medium therebetween.

5. The combination as set forth in claim 4 wherein said means includes a line for supplying a flow of working medium to said pressure vessel and a condensate pump connected within said line for pumping the working medium therethrough; and wherein said closed ring is connected to said line at spaced points upstream and downstream of said condensate pump.

6. The combination as set forth in claim 1 wherein said means includes a feed line connected to said pressure vessel for supplying a flow of working medium thereto, at least one feed pump connected to said feed line for pumping the working medium therethrough, a supply line connected to said feed pump for delivering the working medium thereto; and a condensate pump within said supply line for pumping the working medium therethrough to said feed pump; and wherein said turbines are connected to said feed line to receive working medium therefrom and to said supply line upstream of said condensate pump to deliver working medium thereto.

References Cited

UNITED STATES PATENTS

| | | | |
|---|---|---|---|
| 3,242,053 | 3/1966 | Sanders et al. | 176—56 |
| 3,580,807 | 5/1971 | Kumpf | 176—65 |
| 3,296,083 | 1/1967 | Haake et al. | 176—56 X |
| 3,448,007 | 6/1969 | Ritz | 176—55 X |
| 3,467,578 | 9/1969 | Kornbichler et al. | 176—65 |
| 3,599,424 | 8/1971 | Yampolsky | 60—20 |
| 3,651,866 | 3/1972 | Lileg et al. | 176—65 X |
| 3,437,559 | 4/1969 | Junkermann et al. | 176—65 X |
| 3,663,364 | 5/1972 | Thompson et al. | 176—87 |

CARL D. QUARFORTH, Primary Examiner

R. S. GAITHER, Assistant Examiner

U.S. Cl. X.R.

60—20, 70; 176—50, 55, 56, 64, 87